(12) United States Patent
Kidachi

(10) Patent No.: US 11,064,663 B2
(45) Date of Patent: Jul. 20, 2021

(54) EMITTER AND TUBE FOR DRIP IRRIGATION

(71) Applicant: Enplas Corporation, Saitama (JP)

(72) Inventor: Masahiro Kidachi, Saitama (JP)

(73) Assignee: ENFLAS CORPORATION, Saitama (JP)

( * ) Notice: Subject to any disclaimer, the term of this patent is extended or adjusted under 35 U.S.C. 154(b) by 10 days.

(21) Appl. No.: 16/314,452

(22) PCT Filed: May 10, 2017

(86) PCT No.: PCT/JP2017/017668
§ 371 (c)(1),
(2) Date: Dec. 31, 2018

(87) PCT Pub. No.: WO2018/003303
PCT Pub. Date: Jan. 4, 2018

(65) Prior Publication Data
US 2019/0246576 A1 Aug. 15, 2019

(30) Foreign Application Priority Data
Jun. 29, 2016 (JP) .............................. JP2016-128966

(51) Int. Cl.
*A01G 25/02* (2006.01)
(52) U.S. Cl.
CPC ............ *A01G 25/023* (2013.01); *Y02A 40/22* (2018.01)
(58) Field of Classification Search
CPC ..... A01G 25/02; A01G 25/023; Y02A 40/237
See application file for complete search history.

(56) References Cited

U.S. PATENT DOCUMENTS

| 5,615,838 | A | * | 4/1997 | Eckstein | ............... | A01G 25/023 |
| | | | | | | 239/533.1 |
| 6,302,338 | B1 | * | 10/2001 | Cohen | ................... | A01G 25/023 |
| | | | | | | 239/542 |
| 7,648,085 | B2 | | 1/2010 | Mavrakis et al. | | |
| 8,141,589 | B2 | | 3/2012 | Socolsky | | |
| 8,511,585 | B2 | * | 8/2013 | Keren | ................... | A01G 25/023 |
| | | | | | | 239/542 |

(Continued)

OTHER PUBLICATIONS

International Search Report from International Application No. PCT/JP2017/017668 dated Aug. 8, 2017.

(Continued)

*Primary Examiner* — Alex M Valvis
(74) *Attorney, Agent, or Firm* — Brundidge & Stanger, P.C.

(57) ABSTRACT

This emitter is configured from an emitter body, a film, and a cover. The emitter has a water intake part, a discharge part, a first flow path, a second flow path, a flow reduction part, a flow path opening/closing part, a pressure-reducing flow path, and a bypass flow path. If the pressure of an irrigation liquid flowing through a tube is less than a first pressure, the opening of a first water intake through hole of the cover is sealed with the film. If the pressure of the irrigation liquid flowing through the tube is equal to or greater than the first pressure, the film is deformed so that the irrigation liquid is taken into the emitter body through the first water intake through hole, the space between the film and the cover, and a second water intake through hole.

4 Claims, 9 Drawing Sheets

(56) References Cited

U.S. PATENT DOCUMENTS

| | | | | |
|---|---|---|---|---|
| 10,285,342 | B2* | 5/2019 | Ensworth | A01G 25/023 |
| 10,806,104 | B2* | 10/2020 | Kidachi | A01G 25/16 |
| 2009/0302127 | A1* | 12/2009 | Lutzki | A01G 25/023 |
| | | | | 239/11 |
| 2016/0286740 | A1* | 10/2016 | Kidachi | A01G 25/023 |

OTHER PUBLICATIONS

Extended European Search Report from EP Appln. No. 17819670.5 dated Jan. 21, 2020, 9 pages.

* cited by examiner

EMITTER AND TUBE FOR DRIP IRRIGATION

TECHNICAL FIELD

The present invention relates to an emitter, and a drip irrigation tube including the emitter.

BACKGROUND ART

Conventionally, a drip irrigation method is known as a method for culturing plants. A drip irrigation method is a method in which a drip irrigation tube is disposed on a soil in which plants are planted, and irrigation liquid such as water and liquid fertilizer is fed by a liquid feeding mechanism such as a pump into the drip irrigation tube such that the irrigation liquid is dropped from the drip irrigation tube to the soil. The drip irrigation method has been increasingly attracting attention in recent years since the method can minimize the consumption rate of the irrigation liquid.

Normally, the drip irrigation tube includes a tube provided with a plurality of through holes for discharging irrigation liquid, and a plurality of emitters (also called "drippers") for discharging irrigation liquid from respective through holes. In addition, emitters which are joined on the inner wall surface of a tube (see, for example, PTL 1), and emitters which are inserted to a tube from the outside of the tube are known.

PTL 1 discloses an emitter configured to be joined on the inner wall surface of a tube. The emitter disclosed in PTL 1 includes a plurality of liquid intake ports formed in a surface on the inner wall surface side of the tube, a pressure reducing groove formed in the surface on the inner wall surface side of the tube and connected with the liquid intake port, and an ejection part disposed in the surface on the inner wall surface side of the tube and connected with the downstream end of the pressure reducing channel. When the surface in which the pressure reducing groove and the ejection part are formed is joined to the tube inner wall surface, the opening of the pressure reducing groove is closed with the tube inner surface, and a pressure reducing channel is defined. In addition, the opening of the ejection part covers the tube outlet, and thus the channel in the emitter is communicated with the outside.

CITATION LIST

Patent Literature

PTL 1
U.S. Pat. No. 8,141,589

SUMMARY OF INVENTION

Technical Problem

However, when feeding of irrigation liquid is stopped in a drip irrigation tube using the emitter disclosed in PTL 1, the irrigation liquid temporarily flows back, and foreign matters are sucked from the outside of the tube into the emitter. In addition, in a case where the pressure of the irrigation liquid is significantly low, the flow rate of the irrigation liquid cannot be controlled by the emitter, and liquid draining occurs.

In view of this, an object of the present invention is to provide an emitter and a drip irrigation tube which do not suck foreign matters from the outside of the tube at the time when liquid feeding is stopped, and can quantitatively discharge the irrigation liquid not only when the pressure of the irrigation liquid is a high pressure at which liquid draining is not caused but also when the pressure of the irrigation liquid is significantly low.

Solution to Problem

To solve the above-mentioned problems, an emitter according to an embodiment of the present invention includes an emitter main body, a film having flexibility disposed on a first surface of the emitter main body, and a cover for positioning the film with respect to the emitter main body, the emitter being configured to be joined on an inner wall surface of a tube configured to distribute irrigation liquid at a position corresponding to a discharging port communicating between inside and outside of the tube, the emitter being configured to quantitatively discharge the irrigation liquid in the tube to the outside of the tube from the discharging port, the emitter including: a liquid intake part including a first intake through hole formed in the cover and a second intake through hole formed in the film, the liquid intake part being configured to receive the irrigation liquid; a discharging part disposed in a second surface of the emitter main body and configured to discharge the irrigation liquid, the second surface being opposite to the first surface and being configured to face the discharging port; a first channel configured to connect the liquid intake part and the discharging part together, and to distribute the irrigation liquid; a second channel configured to connect the liquid intake part and the discharging part together, and to distribute the irrigation liquid; a flow rate reducing part disposed in the first channel and including a flow rate reducing recess opening at the first surface and the film closing the flow rate reducing recess opening, the flow rate reducing part being configured to reduce a flow rate of the irrigation liquid flowing to the discharging port by deformation of the film in accordance with a pressure of the irrigation liquid in the tube; a channel opening-closing part disposed in the second channel and including a channel opening-closing recess opening at the first surface and the film closing the channel opening-closing recess opening, the channel opening-closing part being configured to open and close the second channel by deformation of the film in accordance with the pressure of the irrigation liquid in the tube; a pressure reducing channel disposed in the first channel located upstream of the flow rate reducing part, the pressure reducing channel being configured to guide, to the flow rate reducing part, the irrigation liquid received from the liquid intake part while reducing a pressure of the irrigation liquid received from the liquid intake part; and a bypass channel disposed in the second channel located upstream of the channel opening-closing part, the bypass channel being configured to guide, to the channel opening-closing part, the irrigation liquid received from the liquid intake part while maintaining the pressure of the irrigation liquid received from the liquid intake part at a pressure higher than a pressure of the irrigation liquid which has flown through the pressure reducing channel. When the pressure of the irrigation liquid in the tube is lower than a first pressure, an opening of the first intake through hole is closed with the film. When the pressure of the irrigation liquid in the tube is equal to or higher than the first pressure, the film deforms, and the irrigation liquid is allowed to enter the emitter main body through a gap between the first intake through hole, the film and the cover and the second intake through hole. When the pressure of the irrigation liquid in the tube the is equal to or higher than the first pressure and lower than a second pressure higher than the first pressure, the irrigation liquid received from the liquid intake part is guided to the discharging part through the pressure reducing channel and the bypass channel. When the pressure of the irrigation liquid in the tube is equal to or higher than the second pressure, the channel opening-closing part closes the second channel, and the irrigation liquid received from the liquid intake part is guided to the discharging part through the pressure reducing channel.

To solve the above-mentioned problems, a drip irrigation tube according to an embodiment of the present invention includes: a tube including a discharging port configured to discharge irrigation liquid; and the emitter according to any one of claims 1 to 3, the emitter being joined at a position corresponding to the discharging port of an inner wall surface of the tube.

Advantageous Effects of Invention

With the emitter and the drip irrigation tube according to the embodiment of the present invention, it is possible to quantitatively discharge irrigation liquid not only when the pressure of the irrigation liquid is high, but also when the pressure is low. In addition, the emitter and the drip irrigation tube according to the embodiment of the present invention can achieve quantitative watering over long distance. When the liquid feeding mechanism is not operating, back flow of irrigation liquid can be prevented. In addition, with the emitter and the drip irrigation tube according to an embodiment of the present invention, liquid draining hardly occurs even when the pressure of the irrigation liquid is significantly low.

DESCRIPTION OF EMBODIMENTS

An embodiment of the present invention is elaborated below with reference to the accompanying drawings.
Configurations of Drip Irrigation Tube and Emitter FIG. 1 is a sectional view along the axial direction of drip irrigation tube 100 according to an embodiment of the present invention.

Figure 1:
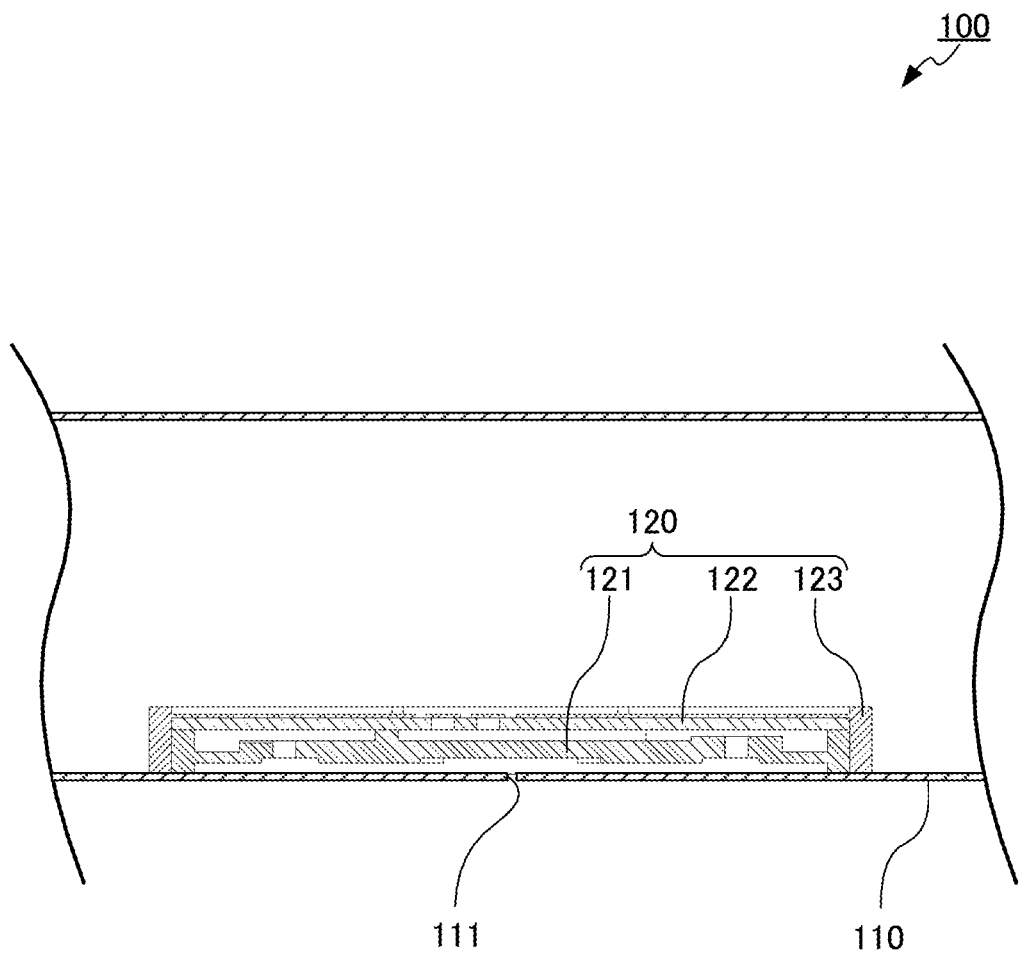
FIG. 1 is a sectional view of a drip irrigation tube.

As illustrated in FIG. 1, drip irrigation tube 100 includes tube 110 and emitter 120.

Tube 110 is a pipe for carrying irrigation liquid. The material of tube 110 is not limited. In the present embodiment, the material of tube 110 is polyethylene. In the wall of tube 110, a plurality of discharging ports 111 for discharging irrigation liquid are formed at a predetermined interval (for example, 200 to 500 mm) in the axial direction of tube 110.

The diameter of the opening of discharging port 111 is not limited as long as irrigation liquid can be discharged. In the present embodiment, the diameter of the opening of discharging port 111 is 1.5 mm. Emitters 120 are joined on the inner wall surface of tube 110 at respective positions corresponding to discharging ports 111. The cross-sectional shape and the cross-sectional area of tube 110 in the direction perpendicular to the axial direction of tube 110 are not limited as long as emitter 120 can be disposed inside tube 110.

Drip irrigation tube 100 is assembled by joining the rear surface of emitter 120 to the inner wall surface of tube 110. The method of joining tube 110 and emitter 120 is not limited. Examples of the method of joining tube 110 and emitter 120 include welding of the resin material of tube 110 or emitter 120, bonding with an adhesive agent and the like. Normally, discharging port 111 is formed after tube 110 and emitter 120 are joined to each other. Discharging port 111 may be formed before tube 110 and emitter 120 are joined to each other.

Emitter 120 is joined on the inner wall surface of tube 110 in such a manner as to cover discharging port 112. The shape of emitter 120 is not limited as long as emitter 120 can make intimate contact with the inner wall surface of tube 110 and can cover discharging port 111. In the present embodiment, in the cross-section of emitter 120 in the direction perpendicular to the axial direction of tube 110, the rear surface, which is joined to the inner wall surface of tube 110, of emitter 120 has a substantially arc shape protruding toward the inner wall surface of tube 110 along the inner wall surface of tube 110. In addition, in plan view, emitter 120 has a substantially rectangular shape with chamfered four corners. The size of emitter 120 is not limited. In the present embodiment, emitter 120 has a long side length of 25 mm, a short side length of 8 mm, and a height of 2.5 mm.

Figure 2A:
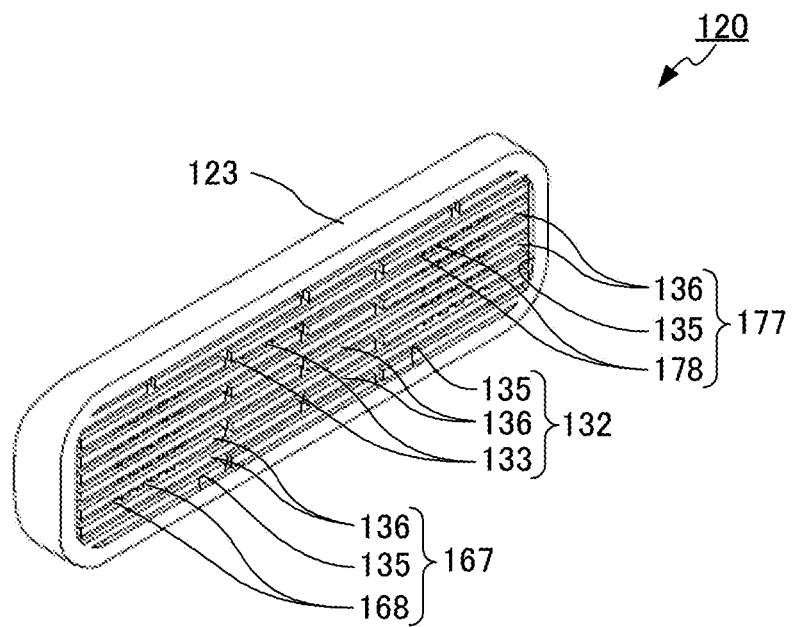
FIGS. 2A and 2B are perspective views of an emitter.
Figure 2B:
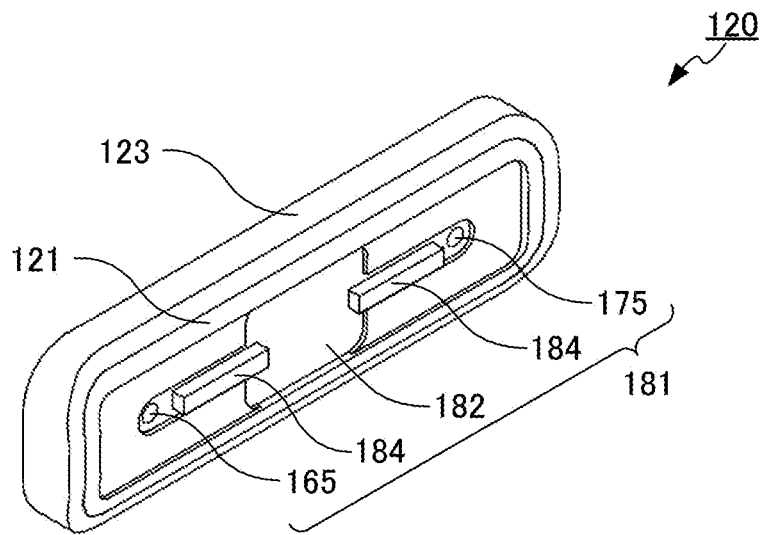
Figure 3A:
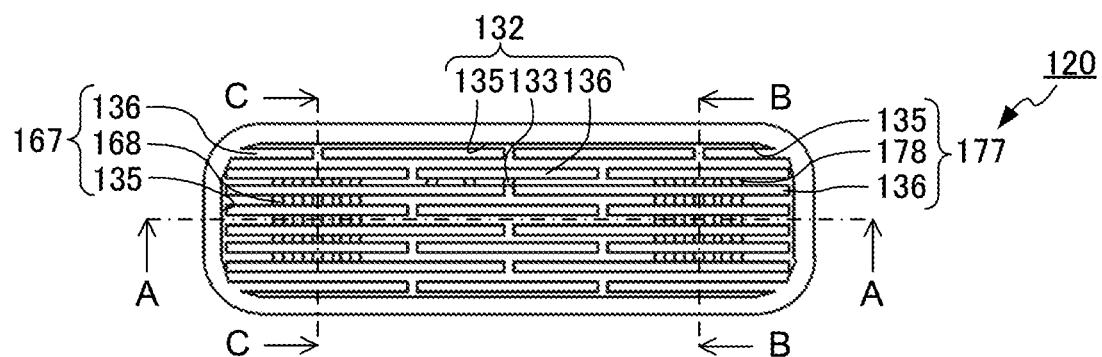
FIGS. 3A to 3D illustrate a configuration of the emitter.
Figure 3B:
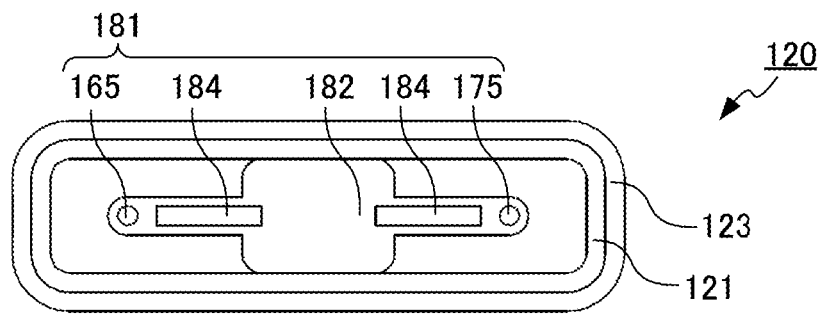
Figure 3C:
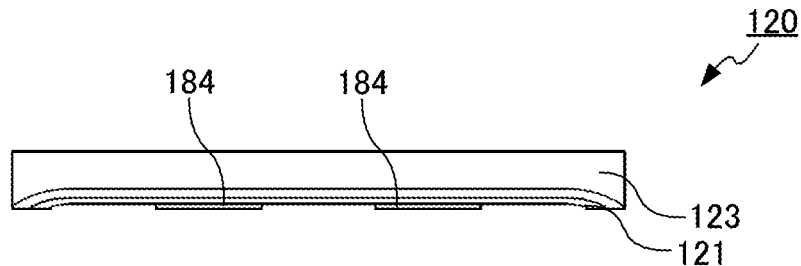
Figure 3D:
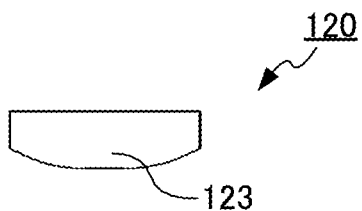
Figure 4A:
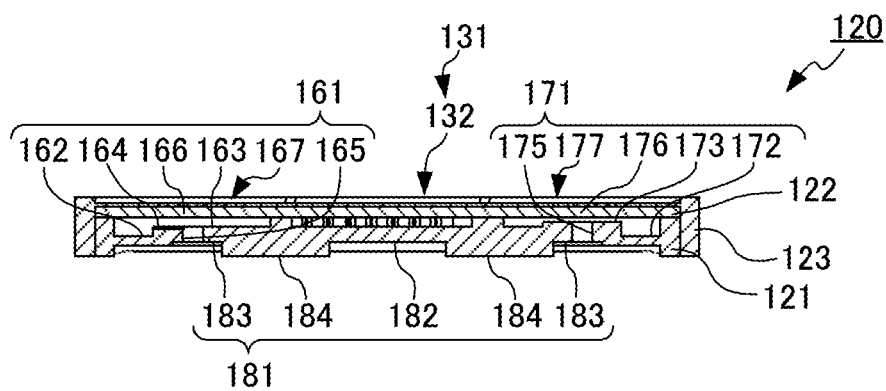
FIGS. 4A to 4C sectional views of the emitter.
Figure 4B:
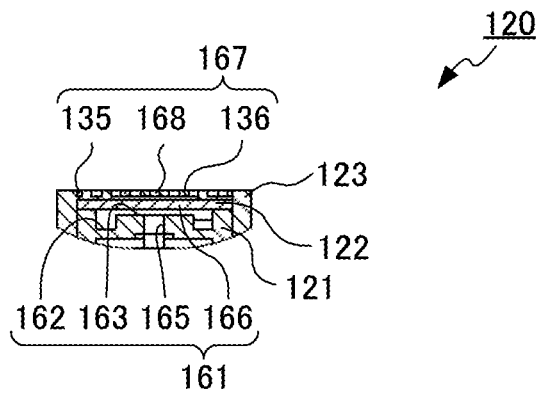
Figure 4C:
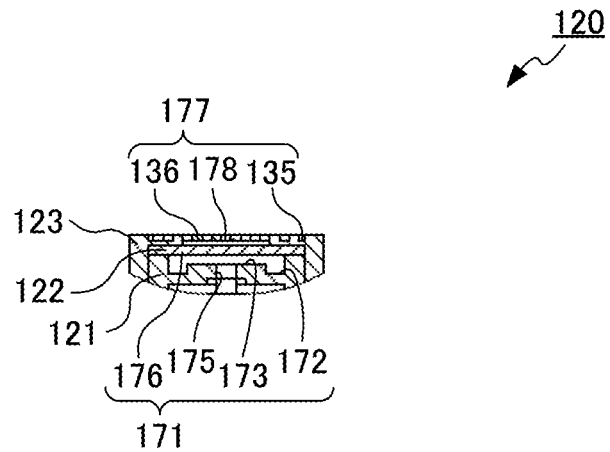
Figure 5A:
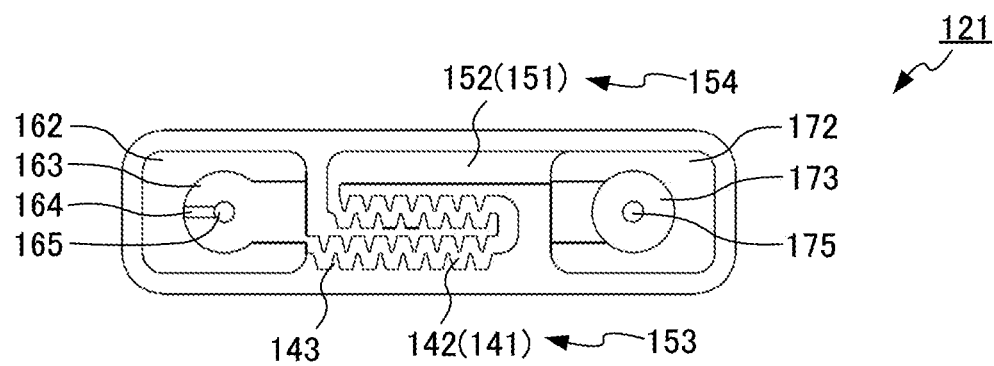
FIGS. 5A to 5D illustrate a configuration of an emitter main body.
Figure 5B:
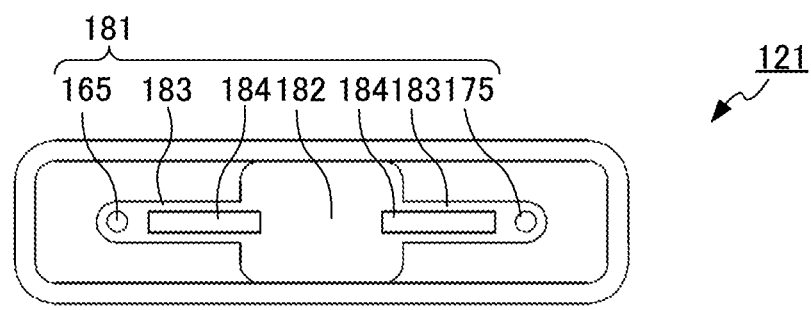
Figure 5C:
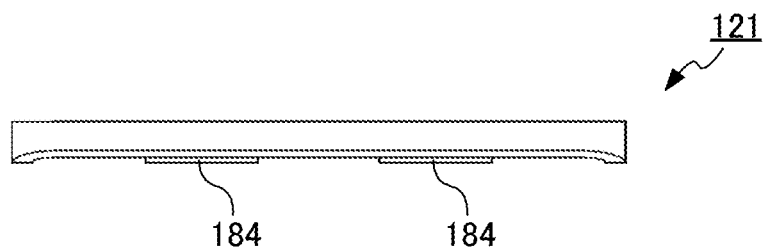
Figure 5D:
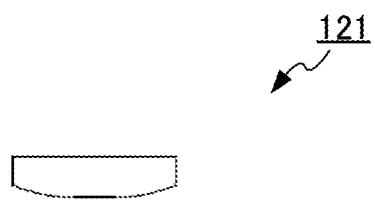
Figure 6A:
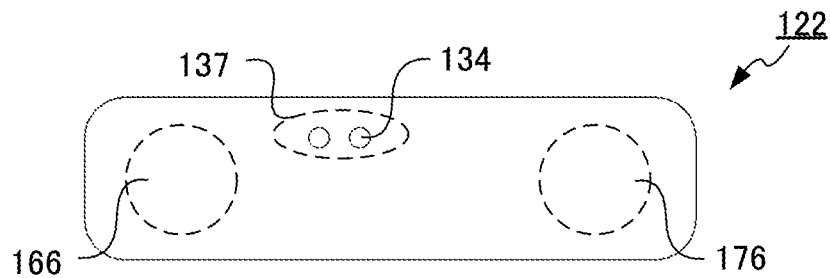
FIGS. 6A to 6C illustrate a configuration of a film.
Figure 6B:
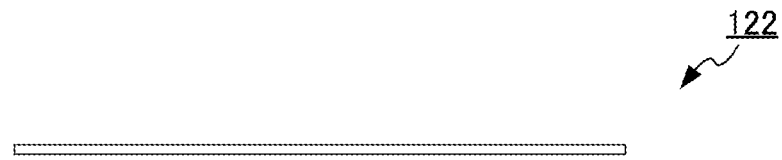
Figure 6C:
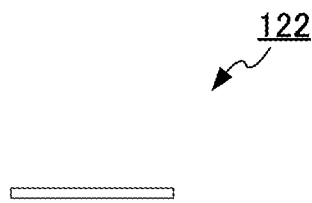
Figure 7A:
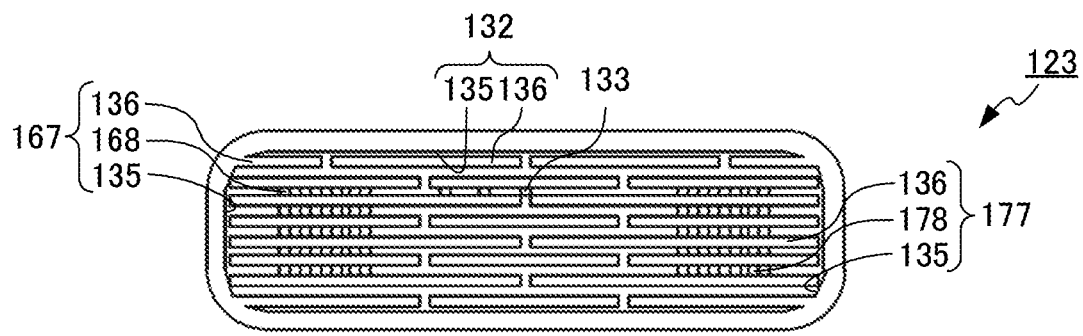
FIGS. 7A to 7D illustrate a configuration of a cover.
Figure 7B:
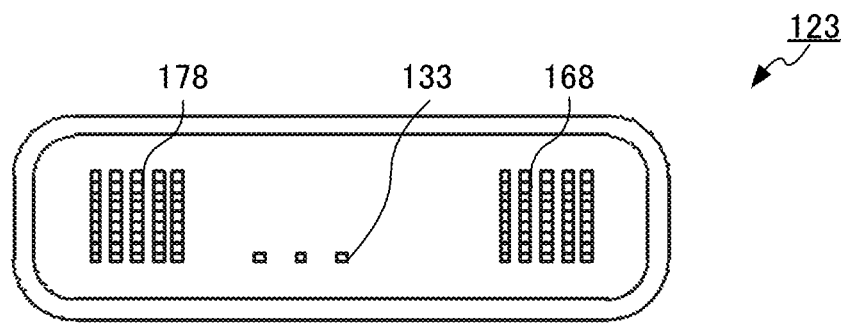
Figure 7C:
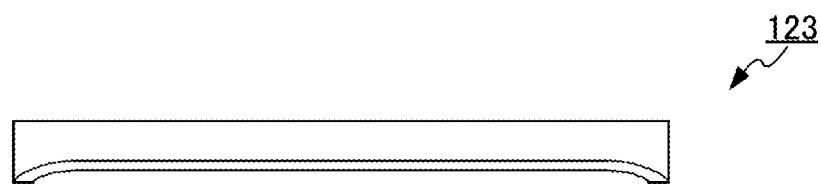
Figure 7D:
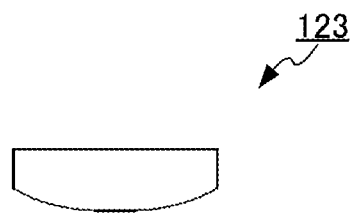

FIGS. 2A to 4C illustrate a configuration of emitter 120. FIG. 2A is a perspective view of emitter 120 as viewed from the front surface (first surface) side, and FIG. 2B is a perspective view of emitter 120 as viewed from the rear surface (second surface) side. FIG. 3A is a plan view of emitter 120, FIG. 3B is a bottom view of emitter 120, FIG. 3C is a front view of emitter 120, and FIG. 3D is a right side view of emitter 120. FIG. 4A is a sectional view taken along line A-A of FIG. 3A, FIG. 4B is a sectional view taken along line B-B of FIG. 3A, and FIG. 4C is a sectional view taken along line C-C of FIG. 3A. FIGS. 5A to 5D illustrate a configuration of emitter main body 121. FIG. 5A is a plan view of emitter main body 121, FIG. 5B is a bottom view of emitter main body 121, FIG. 5C is a front view of emitter main body 121, and FIG. 5D is a right side view of emitter main body 121. FIGS. 6A to 6C illustrate a configuration of film 122. FIG. 6A is a plan view of film 122, FIG. 6B is a front view of film 122, and FIG. 6C is a right side view of film 122. FIGS. 7A to 7D illustrate a configuration of cover 123. FIG. 7A is a plan view of cover 123, FIG. 7B is a bottom view of cover 123, FIG. 7C is a front view of cover 123, and FIG. 7D is a right side view of cover 123.

As illustrated in FIGS. 2A to 4C, emitter 120 is composed of emitter main body 121, film 122, and cover 123. That is, emitter 120 according to the present embodiment has a 3-body structure. In addition, emitter 120 includes liquid intake part 131, pressure reducing channel 141, flow rate reducing part 161, channel opening-closing part 171, bypass channel 151, and discharging part 181.

A main portion of emitter 120 is formed in emitter main body 121. As illustrated in FIGS. 4A to 5D, in the present embodiment, pressure reducing groove 142 that forms pressure reducing channel 141, flow rate reducing recess 162 that forms flow rate reducing part 161, bypass groove 152 that forms bypass channel 151, channel opening-closing recess 172 that forms channel opening-closing part 171, and discharging part 181 are formed in emitter main body 121. Pressure reducing groove 142, flow rate reducing recess 162, bypass groove 152, and channel opening-closing recess 172 open at the first surface. In addition, discharging part 181 is disposed in the second surface.

Film 122 deforms in accordance with the pressure of the irrigation liquid in tube 110 to thereby adjust the amount of the irrigation liquid to be sent to discharging part 181. Film 122 is disposed on the front surface (first surface) side of emitter main body 121. The shape of film 122 in plan view is not limited as long as the above-described function can be ensured. As illustrated in FIGS. 6A to 6C, in the present embodiment, the shape of film 122 in plan view is identical to the external shape of the first surface of emitter main body 121. In addition, as illustrated in FIGS. 4A to 6C, in the present embodiment, film 122 includes first diaphragm part 137 that forms liquid intake part 131, second diaphragm part 166 that forms flow rate reducing part 161, and third diaphragm part 176 that forms channel opening-closing part 171, and, second intake through hole 134 that forms liquid intake part 131 is formed in first diaphragm part 137. Film 122 has a thickness of 0.3 mm, for example.

Cover 123 positions film 122 with respect to the first surface of emitter main body 121. The shape of cover 123 is not limited as long as the above-described function can be ensured. As illustrated in FIGS. 7A to 7D, in the present embodiment, cover 123 has a shape of a box with one open side. In addition, cover 123 is formed such that emitter main body 121 having film 122 disposed on the first surface is fitted to the inside of cover 123. In addition, in the present embodiment, liquid intake screen part 132 that forms liquid intake part 131, first screen part 167 that forms flow rate reducing part 161, and second screen part 177 that forms channel opening-closing part 171 are formed in cover 123.

Emitter 120 is produced by disposing film 122 to the first surface side of emitter main body 121, and then by fitting emitter main body 121 to cover 123 such that film 122 makes contact with the bottom surface of cover 123.

The material of emitter main body 121 and cover 123 is not limited as long as the material has an elasticity that allows fitting of emitter main body 121 to cover 123. Examples of the material of emitter main body 121 and cover 123 include resins such as polyethylene and silicone, and a rubber. In the present embodiment, polyethylene is used as the material of emitter main body 121 and cover 123 in view of manufacturing cost and required elasticity. In addition, the material of film 122 is not limited as long as the material allows appropriate deformation in accordance with the pressure of the irrigation liquid in tube 110. Examples of the material of film 122 include a resin such as polyethylene and silicone, and a rubber. In the present embodiment, silicone is used as the material of film 122 in view of required elasticity. While film 122 is shaped with a material different from that of emitter main body 121 and cover 123 in the present embodiment, emitter main body 121, cover 123, and film 122 may be shaped with the same material. The flexibility of emitter main body 121, film 122 and cover 123 can be adjusted by use of elastic resin material. Examples of the method of adjusting the flexibility of emitter main body 121, film 122 and cover 123 include selection of an elastic resin, adjustment of the mixing ratio of an elastic resin material to a hard resin material, and the like. Each of emitter main body 121, film 122 and cover 123 can be manufactured by injection molding, for example. In addition, film 122 may be produced by cutting out a commercially available film.

When film 122 is disposed on the first surface of emitter main body 121, pressure reducing groove 142 and bypass groove 152 serve as pressure reducing channel 141 and bypass channel 151, respectively. Meanwhile, flow rate reducing recess 162 and channel opening-closing recess 172 serve as flow rate reducing part 161 and channel opening-closing part 171, respectively. In addition, when cover 123 is attached to emitter main body 121 provided with film 122, liquid intake screen part 132, first intake through hole 133 and second intake through hole 134 serve as liquid intake part 131. In this manner, first channel 153, which including liquid intake part 131, pressure reducing channel 141, flow rate reducing part 161 and discharging part 181, and connects liquid intake part 131 and discharging part 181 together, is formed. In addition, second channel 154, which includes liquid intake part 131, bypass channel 151, channel opening-closing part 171 and discharging part 181, and connects liquid intake part 131 and discharging part 181 together, is formed. Each of first channel 153 and second channel 154 distributes irrigation liquid from liquid intake part 131 to discharging part 181.

Liquid intake part 131 is disposed on the front surface side of emitter 120 (see FIG. 4A). Liquid intake part 131 allows the irrigation liquid in tube 110 to enter the emitter. In addition, the liquid intake part prevents liquid draining even when the pressure of the irrigation liquid is significantly low, and prevents back flow of the irrigation liquid when feeding of the irrigation liquid is stopped. Liquid intake part 131 includes liquid intake screen part 132, first intake through hole 133 (see FIG. 7A), first diaphragm part 137 and second intake through hole 134 (see FIG. 6A).

Liquid intake screen part 132 prevents entry, into emitter main body 121, of floating matters in the irrigation liquid to be taken into emitter 120. Liquid intake screen part 132 is formed in the entirety of the front surface of cover 123. Liquid intake screen part 132 opens to the interior of tube 110, and includes cover recess 135 and a plurality of projected lines 136.

Cover recess 135 is a single recess formed in the entirety of the top surface of cover 123. The depth of cover recess 135 is not limited, and is appropriately set in accordance with the size of emitter 120. Projected lines 136 are disposed on the bottom surface of cover recess 135. In addition, first intake through hole 133, flow rate reducing through hole 168 and channel opening-closing through hole 178 open at the bottom surface of cover recess 135 (see FIG. 7A and FIG. 7B).

Projected lines 136 are disposed on the bottom surface of cover recess 135. The installation and number of projected lines 136 are not limited as long as entry of floating matters of irrigation liquid can be prevented while allowing entry of the irrigation liquid from the opening side of cover recess 135. In the present embodiment, projected line 136 is disposed along the longitudinal axial direction of emitter 120. Projected line 136 may be formed such that the width of projected line 136 decreases from the bottom surface of cover recess 135 toward the front surface of cover 123, or that the width of projected line 136 is the same from the bottom surface of cover recess 135 to the front surface of cover 123.

First intake through hole 133 opens at the bottom surface of cover recess 135. The shape and number of first intake through hole 133 are not limited as long as the irrigation liquid taken into cover recess 135 can be guided into emitter main body 121 through second intake through hole 134. In the present embodiment, first intake through hole 133 is three rectangular holes formed along the longitudinal axial direction of the bottom surface of cover recess 135 (see FIG. 7B). It is to be noted that, in the state where the pressure of the irrigation liquid flowing through tube 110 is lower than a first pressure, the opening of first intake through hole 133 on cover recess 135 side is closed with film 122.

First diaphragm part 137 is a part of film 122. First diaphragm part 137 is disposed in such a manner as to close first intake through hole 133. Since the irrigation liquid in tube 110 is in contact with first diaphragm part 137 through first intake through hole 133, first diaphragm part 137 deforms toward the inside of bypass groove 152 in accordance with the pressure of the irrigation liquid in tube 110. When first diaphragm part 137 deforms toward the inside of bypass groove 152, the inside of tube 110 and bypass channel 151 are communicated with each other.

Second intake through hole 134 is formed in first diaphragm part 137 of film 122. The shape and number of second intake through hole 134 are not limited as long as the irrigation liquid taken from first intake through hole 133 can be guided to pressure reducing channel 141 and bypass channel 151. In the present embodiment, second intake through hole 134 has a shape of two circles (see FIG. 6A).

When emitter 120 is viewed from cover 123 side, first intake through hole 133 and second intake through hole 134 are spaced apart. That is, first intake through hole 133 is formed in a region other than the region opposite to second intake through hole 134 in cover 123. Likewise, second intake through hole 134 is formed in a region other than the region opposite to first intake through hole 133 in film 122. Preferably, the distance between first intake through hole 133 and second intake through hole 134 of emitter 120 viewed from cover 123 side is, but not limited to, 1.0 to 5.0 mm. In the case where the distance between first intake through hole 133 and second intake through hole 134 of emitter 120 viewed from cover 123 side is smaller than 1.0 mm, film 122 (first diaphragm part 137) might not appropriately close first intake through hole 133 even when the pressure of the irrigation liquid flowing through tube 110 is significantly low. In the case where the distance between first intake through hole 133 and second intake through hole 134 of emitter 120 viewed from cover 123 side is greater than 5.0 mm, the gap between film 122 and cover 123 might not be appropriately formed even when the pressure of the irrigation liquid flowing through tube 110 is relatively high.

Liquid intake screen part 132 prevents the floating matters of the irrigation liquid which has passed through tube 110 from entering cover recess 135, and this irrigation liquid is then taken into emitter main body 121 through first intake through hole 133 and second intake through hole 134. Here, when the pressure of the irrigation liquid flowing through tube 110 is equal to or higher than the first pressure, the gap is formed between film 122 and cover 123 by deformation of film 122, and the irrigation liquid is allowed to enter emitter main body 121 through the gap between first intake through hole 133, film 122 and cover 123, and through second intake through hole 134.

Pressure reducing channel 141 (pressure reducing groove 142), which is disposed in first channel 153 located upstream of flow rate reducing part 161, connects liquid intake part 131 and flow rate reducing part 161 together. Pressure reducing channel 141 (pressure reducing groove 142) guides the irrigation liquid taken from liquid intake part 131 to flow rate reducing part 161 while reducing the pressure of the irrigation liquid. Pressure reducing channel 141 is disposed at a center portion of emitter 120. Pressure reducing channel 141 is composed of pressure reducing groove 142, and film 122 for closing the opening of pressure reducing groove 142. Pressure reducing groove 142 is formed in the front surface (first surface) of emitter main body 121. The shape of pressure reducing groove 142 is not limited as long as the above-described function can be ensured as pressure reducing channel 141. In the present embodiment, pressure reducing groove 142 has a zigzag shape in plan view. In pressure reducing groove 142, protrusions 143, each of which has a substantially triangular prism shape and protrudes from the inner surface of pressure reducing groove 142, are alternately disposed along the flow direction of the irrigation liquid. In plan view, protrusions 143 are disposed such that the tip of each protrusion 143 does not cross the central axis of end pressure reducing groove 142. When film 122 is disposed on the first surface of emitter main body 121, pressure reducing groove 142 and a part of the rear surface of film 122 form pressure reducing channel 141. At least a part of the irrigation liquid taken from liquid intake part 131 is guided to flow rate reducing part 161 while the pressure thereof is reduced by reducing channel 141. As elaborated later, pressure reducing channel 141 operates mainly when the pressure of irrigation liquid is high.

Bypass channel 151 (bypass groove 152), which is disposed in second channel 154 located upstream of channel opening-closing part 171, connects liquid intake part 131 and channel opening-closing part 171 together. Bypass channel 151 (bypass groove 152) guides, to channel opening-closing part 171, the irrigation liquid taken from liquid intake part 131 while maintaining the pressure of the liquid at a value higher than that of the irrigation liquid which has flown through pressure reducing channel 141 (pressure reducing groove 142). When film 122 is disposed on the first surface of emitter main body 121, bypass groove 152 and a part of the rear surface of film 122 form bypass channel 151. A part of the irrigation liquid taken from liquid intake part 131 passes through bypass channel 151 and is guided to channel opening-closing part 171. As elaborated later, bypass channel 151 operates only when the pressure of the irrigation liquid is low.

It is to be noted that a pressure reducing channel may be disposed in bypass groove 152. The pressure reducing channel is disposed for controlling the flow rate.

Flow rate reducing part 161 is disposed between pressure reducing channel 141 and discharging part 181 in first channel 153. Flow rate reducing part 161 sends the irrigation liquid to irrigation liquid discharging part 181 while reducing the flow rate of the irrigation liquid in accordance with the pressure of the irrigation liquid in tube 110. The configuration of flow rate reducing part 161 is not limited as long as the above-described function can be ensured. In the present embodiment, flow rate reducing part 161 includes flow rate reducing recess 162, first valve seat part 163, communication groove 164, first discharging through hole 165 communicated with discharging part 181, second diaphragm part 166, which is a part of film 122, and first screen part 167.

The shape of flow rate reducing recess 162 in plan view is not limited. The shape of flow rate reducing recess 162 in plan view may be a substantially rectangular shape with chamfered four corners, or a substantially semicircular shape. In the present embodiment, the shape of flow rate reducing recess 162 in plan view is a substantially rectangular shape with chamfered four corners. First discharging through hole 165 communicated with discharging part 181 opens at the bottom surface of flow rate reducing recess 162, and first valve seat part 163 is disposed in the bottom surface of flow rate reducing recess 162. In addition, pressure reducing channel 141 (pressure reducing groove 142) is connected with the side surface of flow rate reducing recess 162. The depth of flow rate reducing recess 162 is not limited as long as the depth is equal to or greater than the depth of communication groove 164 and pressure reducing groove 142.

First discharging through hole 165 opens at a center portion of the bottom surface of flow rate reducing recess 162, and is communicated with discharging part 181. First valve seat part 163 is disposed in the bottom surface of flow rate reducing recess 162 in such a manner as to surround first discharging through hole 165. First valve seat part 163 is formed such that second diaphragm part 166 can make intimate contact with first valve seat part 163 when the pressure of the irrigation liquid flowing through tube 110 is the second pressure or higher. When second diaphragm part 166 makes contact with first valve seat part 163, the flow rate of the irrigation liquid flowing into discharging part 181 from flow rate reducing recess 162 is reduced. The shape of first valve seat part 163 is not limited as long as the above-described function can be ensured. In the present embodiment, first valve seat part 163 has a shape of an annular protrusion. Communication groove 164, which communicates between the inside of flow rate reducing recess 162 and first discharging through hole 165, is formed in a part of the region of first valve seat part 163 where second diaphragm part 166 can make intimate contact with first valve seat part 163.

Second diaphragm part 166 is a part of film 122. Second diaphragm part 166 is disposed as a partition between the inside of flow rate reducing recess 162 and the inside of tube 110. Second diaphragm part 166 deforms in such a manner as to make contact with first valve seat part 163 in accordance with the pressure of the irrigation liquid in tube 110. To be more specific, second diaphragm part 166 deforms toward first valve seat part 163 as the pressure of the irrigation liquid increases, and finally makes contact with first valve seat part 163. Even when second diaphragm part 166 is in intimate contact with first valve seat part 163, neither of the end portion of pressure reducing channel 141, first discharging through hole 165, nor communication groove 164 is closed by second diaphragm part 166, and thus the irrigation liquid sent from pressure reducing channel 141 can be sent to discharging part 181 through communication groove 164 and first discharging through hole 165.

First screen part 167 sends the irrigation liquid to the front surface of second diaphragm part 166 with almost no change in pressure of the irrigation liquid. First screen part 167 includes a part of cover recess 135, some of projected lines 136, and flow rate reducing through hole 168. Flow rate reducing through hole 168 is formed in a bottom portion of cover 123 at a position corresponding to second diaphragm part 166. The shape and number of flow rate reducing through hole 168 are not limited as long as the above-described function can be ensured. The shape of flow rate reducing through hole 168 in plan view may be a circular shape or a rectangular shape. In the present embodiment, flow rate reducing through hole 168 has a rectangular shape in plan view. In addition, the number of flow rate reducing through hole 168 is not limited. In the present embodiment, flow rate reducing through holes 168 is five long holes formed along the minor axis direction of the bottom surface of cover recess 135. The long holes are covered with projected lines 136, and therefore each flow rate reducing through hole 168 appears to be divided into multiple through holes as viewed from the front side.

Channel opening-closing part 171 is disposed between bypass channel 151 and discharging part 181 in second channel 154. In accordance with the pressure in tube 110, channel opening-closing part 171 opens second channel 154 and sends the irrigation liquid to discharging part 181. The configuration of channel opening-closing part 171 is not limited as long as the above-described function can be ensured. In the present embodiment, channel opening-closing part 171 includes channel opening-closing recess 172, second valve seat part 173, second discharging through hole 175 communicated with discharging part 181, third diaphragm part 176, which is a part of film 122, and second screen part 177.

The shape of channel opening-closing recess 172 in plan view is not limited. The shape of channel opening-closing recess 172 in plan view may be a substantially rectangular shape with chamfered four corners, or a substantially semi-circular shape. In the present embodiment, channel opening-closing recess 172 has a substantially rectangular shape with chamfered four corners in plan view. Second discharging through hole 175 communicated with discharging part 181, and second valve seat part 173 are disposed in the bottom surface of channel opening-closing recess 172. In addition, bypass channel 151 (bypass groove 152) is connected with the side surface of channel opening-closing recess 172. Second valve seat part 173 is disposed on the first surface side relative to first valve seat part 163. With this configuration, when film 122 is deformed under the pressure of the irrigation liquid, film 122 makes contact with second valve seat part 173 before making contact with first valve seat part 163.

Second discharging through hole 175 opens at a center portion of the bottom surface of channel opening-closing recess 172, and is communicated with discharging part 181. Second valve seat part 173 is disposed in the bottom surface of channel opening-closing recess 172 in such a manner as to surround second discharging through hole 175. In addition, second valve seat part 173 is disposed to face third diaphragm part 176 without making contact with third diaphragm part 176, and is formed such that third diaphragm part 176 can make intimate contact with second valve seat part 173 when the pressure of the irrigation liquid flowing through tube 110 is the second pressure or higher. When the pressure of the irrigation liquid flowing through tube 110 is the second pressure or higher, third diaphragm part 176 makes intimate contact with second valve seat part 173 to close second discharging through hole 175, and thus closes second channel 154. The shape of second valve seat part 173 is not limited as long as the above-described function can be ensured. In the present embodiment, second valve seat part 173 is an annular protrusion.

Third diaphragm part 176 is a part of film 122. Third diaphragm part 176 is disposed as a partition between the inside of channel opening-closing recess 172 and the inside of tube 110. In accordance with the pressure of the irrigation liquid in tube 110, third diaphragm part 176 deforms to make contact with second valve seat part 173. To be more specific, as the pressure of the irrigation liquid increases, third diaphragm part 176 deforms toward second valve seat part 173, and when the pressure of irrigation liquid becomes the second pressure, third diaphragm part 176 makes contact with second valve seat part 173. In this manner, second channel 154 (second discharging through hole 175) is closed.

Second screen part 177 sends the irrigation liquid to the front surface of third diaphragm part 176 with almost no change in pressure of the irrigation liquid. Second screen part 177 includes a part of cover recess 135, some of projected lines 136, and channel opening-closing through hole 178. Channel opening-closing through hole 178 is formed in a bottom portion of cover 123 at a position corresponding to third diaphragm part 176. The shape and number of channel opening-closing through hole 178 are not limited as long as the above-described function can be ensured. Channel opening-closing through hole 178 may have a circular shape or a rectangular shape in plan view. In the present embodiment, channel opening-closing through hole 178 has a rectangular shape in plan view. In addition, the number of channel opening-closing through hole 178 is not limited. In the present embodiment, channel opening-closing through hole 178 is five long holes formed along the minor axis direction of the bottom surface of cover recess 135.

The long holes are covered with projected lines 136, and therefore each channel opening-closing through hole 178 appears to be divided into multiple through holes as viewed from the front side.

Discharging part 181 is disposed on the rear surface side of emitter 120 facing discharging port 111. Discharging part 181 sends the irrigation liquid from first discharging through hole 165 and second discharging through hole 175 to discharging port 111 of tube 110. The configuration of discharging part 181 is not limited as long as the above-described function can be ensured. In the present embodiment, discharging part 181 includes discharging recess 182, a pair of discharging grooves 183, and a pair of entry preventing parts 184.

Discharging recess 182 opens at the rear surface of emitter main body 121.

Discharging recess 182 has a substantially rectangular shape in plan view. The pair of discharging grooves 183 open toward each other at opposite side surfaces of discharging recess 182.

The pair of entry preventing parts 184 prevents entry of foreign matters from discharging port 111. The position of entry preventing part 184 is not limited as long as the above-described function can be ensured. In the present embodiment, entry preventing part 184 is disposed such that entry preventing part 184 is located between first discharging through hole 165 and discharging port 111, and between second discharging through hole 175 and discharging port 111 when emitter 120 is joined to tube 110.

Operations of Drip Irrigation Tube and Emitter

Next, an operation of drip irrigation tube 100 is described. First, irrigation liquid is fed into tube 110. Examples of the irrigation liquid include water, liquid fertilizer, agricultural chemicals and mixtures thereof. Preferably, the pressure of the irrigation liquid that is fed to drip irrigation tube 100 is 0.1 MPa or lower in view of simply implementing the drip irrigation method, or preventing damaging of tube 110 and emitter 120. The irrigation liquid in tube 110 is taken into emitter main body 121 from liquid intake part 131. To be more specific, the irrigation liquid in tube 110 enters cover recess 135 from the gap between each projected line 136, and passes through first intake through hole 133 to thereby push film 122 to emitter main body 121 side. The irrigation liquid past first intake through hole 133 passes through second intake through hole 134 through the gap formed between film 122 and cover 123. At this time, liquid intake part 131 can remove floating matters in the irrigation liquid since liquid intake part 131 includes liquid intake screen part 132 (the gap between each projected line 136).

The irrigation liquid taken from liquid intake part 131 reaches the upstream end of bypass channel 151. The irrigation liquid reaching bypass channel 151 flows toward the downstream of bypass channel 151, and flows into pressure reducing channel 141. At this time, the irrigation liquid first advances through bypass channel 151 that causes smaller pressure drop and has a shorter channel length in comparison with pressure reducing channel 141. The irrigation liquid having entered bypass channel 151 flows into channel opening-closing part 171.

The irrigation liquid having entered channel opening-closing part 171 flows into discharging part 181 when channel opening-closing part 171 is open. The irrigation liquid having entered discharging part 181 is discharged out of tube 110 from discharging port 111 of tube 110. On the other hand, the irrigation liquid having entered pressure reducing channel 141 reaches flow rate reducing part 161. The irrigation liquid having entered flow rate reducing part 161 flows into discharging part 181. The irrigation liquid having entered discharging part 181 is discharged out of tube 110 from discharging port 111 of tube 110.

In addition, when feeding of the irrigation liquid is stopped, the irrigation liquid is temporarily sucked from the outside toward the inside of tube 110. At this time, a pressure is exerted on film 122 from emitter main body 121 side toward cover 123 side. In addition, as described above, first intake through hole 133 and second intake through hole 134 are disposed so as not to be opposite to each other. Accordingly, film 122 is pressed toward cover 123, and film 122 closes first intake through hole 133. With this configuration, foreign matters are not sucked into tube 110 from the outside of tube 110 when feeding of the irrigation liquid is stopped. In addition, even in the case where the pressure of the irrigation liquid is significantly low, liquid draining is not caused.

As described above, in liquid intake part 131, the input and output of the irrigation liquid are controlled by first diaphragm part 137 of film 122 in accordance with the pressure of the irrigation liquid in tube 110. In flow rate reducing part 161, the flow rate of the irrigation liquid is controlled by second diaphragm part 166 in accordance with the pressure of the irrigation liquid in tube 110. In channel opening-closing part 171, the flow rate of the irrigation liquid is controlled by third diaphragm part 176 in accordance with the pressure of the irrigation liquid in tube 110. Accordingly, operations of liquid intake part 131, channel opening-closing part 171 and flow rate reducing part 161 according to the pressure of the irrigation liquid in tube 110 are described below.

Figure 8A:
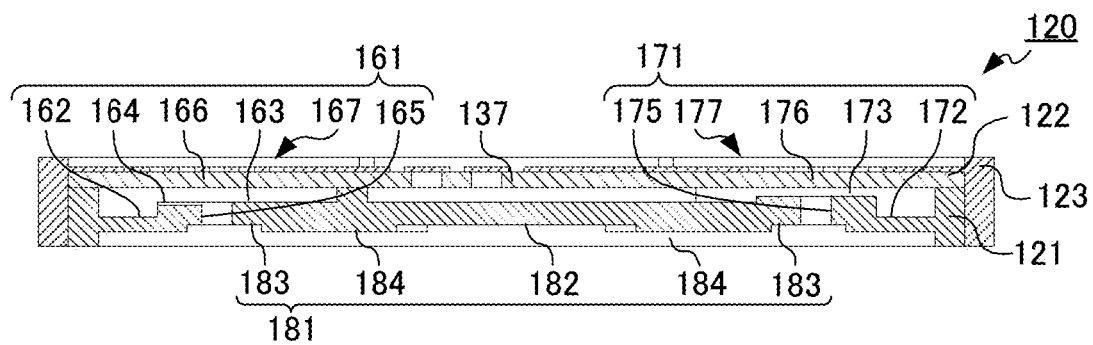
FIGS. 8A to 8D are sectional views for describing operations of the emitter.
Figure 8B:
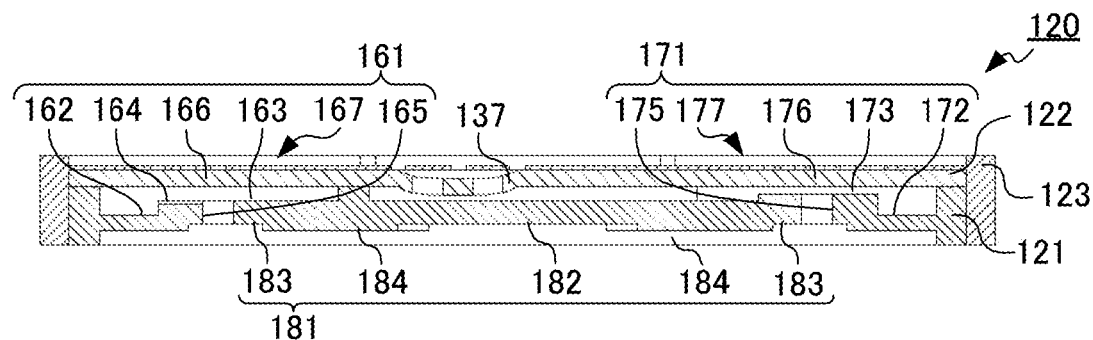
Figure 8C:
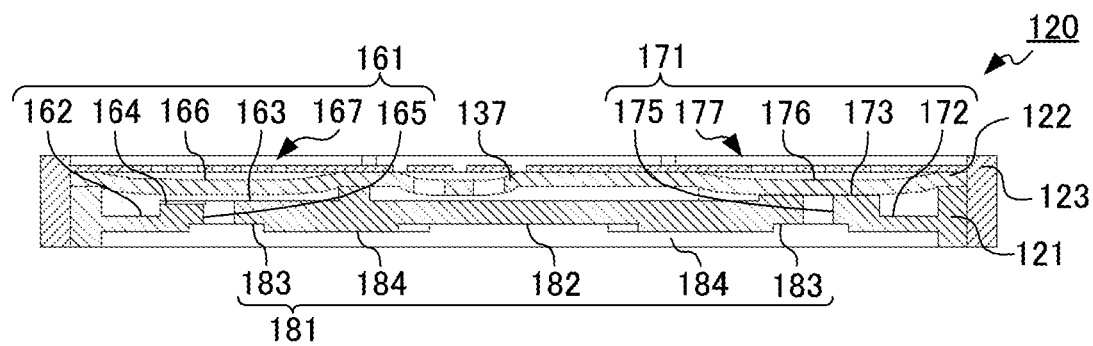
Figure 8D:
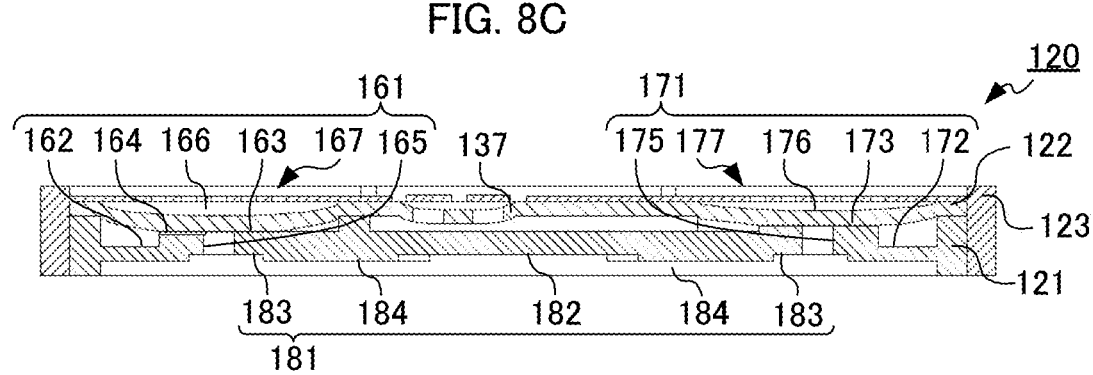
Figure 9:
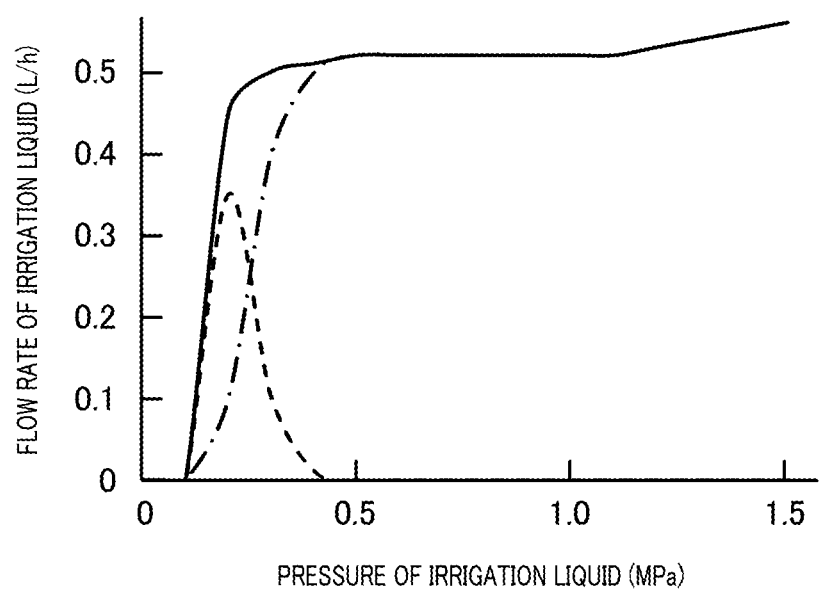
FIG. 9 is a graph showing an exemplary relationship between a pressure of irrigation liquid in the drip irrigation tube and a flow rate of irrigation liquid dropped from a discharging port.

FIGS. 8A to 8D are sectional views of emitter 120 illustrating a relationship between operations of liquid intake part 131, flow rate reducing part 161 and channel opening-closing part 171. FIG. 8A is a sectional view of a case where the irrigation liquid is not fed to tube 110, FIG. 8B is a sectional view of a case where the pressure of the irrigation liquid in tube 110 is a first pressure, FIG. 8C is a sectional view of a case where the pressure of the irrigation liquid in tube 110 is a second pressure higher than the first pressure, and FIG. 8D is a sectional view of a case where the pressure of the irrigation liquid in tube 110 is a third pressure higher than the second pressure. FIG. 9 is a graph showing an exemplary relationship between the pressure of the irrigation liquid in tube 110 and the flow rate of the irrigation liquid dropped from discharging port 111. In FIG. 9, the solid line indicates a total flow rate of the irrigation liquid dropped from discharging port 111, the broken line indicates a flow rate of the irrigation liquid having flown through (bypass channel 151) second channel 154, and the dashed line indicates a flow rate of the irrigation liquid having flown through (pressure reducing channel 141) first channel 153. In FIG. 9, the abscissa indicates a pressure (MPa) of irrigation liquid, and the ordinate indicates a flow rate (L/h) of the irrigation liquid discharged from discharging port 111.

Before the irrigation liquid is fed to tube 110, the pressure of the irrigation liquid is not applied to film 122, and therefore first diaphragm part 137, second diaphragm part 166 and third diaphragm part 176 are not deformed (see FIG. 8A).

When feeding of the irrigation liquid into tube 110 is started and the pressure of the irrigation liquid in tube 110 reaches the first pressure, then first diaphragm part 137 of liquid intake part 131 deforms toward the inside of bypass groove 152. In this manner, the inside of tube 110 and bypass channel 151 are communicated with each other, and the irrigation liquid is taken into emitter 120.

When the irrigation liquid is fed into tube 110, and the pressure of the irrigation liquid flowing through tube 110 is equal to or higher than the first pressure and lower than the second pressure higher than the first pressure, second diaphragm part 166 of flow rate reducing part 161 deforms toward first valve seat part 163. In addition, third diaphragm part 176 of channel opening-closing part 171 deforms toward second valve seat part 173. However, in this state, second diaphragm part 166 is not in contact with first valve seat part 163, and third diaphragm part 176 is not in contact with second valve seat part 173, and therefore, the irrigation liquid taken from liquid intake part 131 is discharged to the outside from discharging port 111 of tube 110 through first channel 153 (pressure reducing channel 141, flow rate reducing part 161 and discharging part 181) and second channel 154 (bypass channel 151, channel opening-closing part 171, flow rate reducing part 161 and discharging part 181). In this manner, when the feeding of irrigation liquid into tube 110 is started, or when the pressure of the irrigation liquid in tube 110 is low, or the like, the irrigation liquid taken from liquid intake part 131 is discharged through pressure reducing channel 141 and bypass channel 151.

When the pressure of the irrigation liquid in tube 110 reaches the second pressure, third diaphragm part 176 makes contact with second valve seat part 173 and closes second channel 154 (see FIG. 8B). At this time, second diaphragm part 166 is not in contact with first valve seat part 163. In this manner, when the pressure of the irrigation liquid in tube 110 is so increased as to deform film 122, third diaphragm part 176 comes closer to second valve seat part 173, and accordingly the amount of the irrigation liquid that is discharged through second channel 154 decreases. Then, when the pressure of the irrigation liquid in tube 110 reaches the second pressure, the irrigation liquid in second channel 154 is not discharged from discharging port 111. As a result, the irrigation liquid taken from intake part 131 is discharged to the outside from discharging port 111 of tube 110 through first channel 153.

When the pressure of the irrigation liquid in tube 110 further increases, second diaphragm part 166 further deforms toward first valve seat part 163. In a normal configuration, the amount of the irrigation liquid that flows through first channel 153 increases as the pressure of the irrigation liquid increases; however, in emitter 120 according to the present embodiment, excessive increase in the amount of the irrigation liquid that flows through first channel 153 is prevented by reducing the pressure of the irrigation liquid with pressure reducing channel 141 and by reducing the distance between second diaphragm part 166 and first valve seat part 163. When the pressure of the irrigation liquid in tube 110 is equal to or higher than the second pressure, which is higher than the first pressure, second diaphragm part 166 makes contact with first valve seat part 163 (see FIG. 8C). Even in this state, neither of flow rate reducing through hole 168, communication groove 164 nor first discharging through hole 165 is closed by second diaphragm part 166, and accordingly the irrigation liquid taken from liquid intake part 131 is discharged to the outside from discharging port 111 of tube 110 through communication groove 164. In this manner, in flow rate reducing part 161, third diaphragm part 176 makes contact with second valve seat part 173 when the pressure of the irrigation liquid in tube 110 is the third pressure higher than the second pressure, and thus increase of the amount of the irrigation liquid flowing through first channel 153 is suppressed (see the dashed line indicated in FIG. 9).

As described above, flow rate reducing part 161 and channel opening-closing part 171 operate such that the amounts of the liquid flowing therethrough are offset each other in accordance with the pressure of the irrigation liquid in tube 110, and thus drip irrigation tube 100 according to the present embodiment can discharge a constant amount of irrigation liquid out of tube 110 regardless whether the pressure of the irrigation liquid is high or low (see the solid line indicated in FIG. 9).

Effect

As described above, drip irrigation tube 100 according to the present embodiment includes channel opening-closing part 171 that operates mainly in the low pressure state, and flow rate reducing part 161 that operates mainly in the high pressure state. Thus drip irrigation tube 100 according to the present embodiment can quantitatively drop the irrigation liquid regardless of the pressure of the irrigation liquid in tube 110. In addition, in drip irrigation tube 100 according to the present embodiment, first intake through hole 133 is closed with film 122, and therefore foreign matters are not sucked into emitter 120 from the outside of tube 110 even in the case where feeding of the irrigation liquid is stopped and temporarily irrigation liquid flows back. Further, in the case where the pressure of the irrigation liquid in tube 110 is lower than the first pressure, the irrigation liquid does not flow into emitter 120, and thus draining of the irrigation to the outside of liquid tube 110 can be prevented.

While pressure reducing groove 142 and bypass groove 152 open at the first surface, and serve as first channel 153 and second channel 154, respectively when the openings thereof are closed with film 122 in the present embodiment, pressure reducing groove 142 and bypass groove 152 may open at the second surface. In this case, the openings of pressure reducing groove 142 and the opening of bypass groove 152 are closed by the inner wall surface of tube 110. In addition, first channel 153 and second channel 154 may be formed inside emitter main body 121.

In addition, while the contact timing of deformed film 122 is adjusted by changing the positions (heights) of first valve seat part 163 and second valve seat part 173, the positions (heights) of first valve seat part 163 and second valve seat part 173 may be set at the same depth. In this case, the contact timing of deformed film 122 may be adjusted by changing the thicknesses and/or the materials (elasticities) of second diaphragm part 166 and third diaphragm part 176.

In addition, while flow rate reducing part 161 and channel opening-closing part 171 are independent of each other in the present embodiment, flow rate reducing part 161 and channel opening-closing part 171 may be communicated with each other.

This application is entitled to and claims the benefit of Japanese Patent Application No. 2016-128966 filed on Jun. 29, 2016, the disclosure each of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
111 Discharging port
120 Emitter
121 Emitter main body
122 Film
123 Cover
131 Liquid intake part
132 Liquid intake screen part
133 First intake through hole
134 Second intake through hole
135 Cover recess
136 Projected line
137 First diaphragm part
141 Pressure reducing channel
142 Pressure reducing groove
143 Protrusion
151 Bypass channel
152 Bypass groove
153 First channel
154 Second channel
161 Flow rate reducing part
162 Flow rate reducing recess
163 First valve seat part
164 Communication groove
165 First discharging through hole
166 Second diaphragm part
167 First screen part
168 Flow rate reducing through hole
171 Channel opening-closing part
172 Channel opening-closing recess
173 Second valve seat part
175 Second discharging through hole
176 Third diaphragm part
177 Second screen part
178 Channel opening-closing through hole
181 Discharging part
182 Discharging recess
183 Discharging groove
184 Entry preventing part

The invention claimed is:

1. An emitter including an emitter main body, a film having flexibility disposed on a first surface of the emitter main body, and a cover for positioning the film with respect to the emitter main body, the emitter being configured to be joined on an inner wall surface of a tube configured to distribute irrigation liquid at a position corresponding to a discharging port communicating between inside and outside of the tube, the emitter being configured to quantitatively discharge the irrigation liquid in the tube to the outside of the tube from the discharging port, the emitter comprising:

a liquid intake part including a first intake through hole formed in the cover and a second intake through hole formed in the film, the liquid intake part being configured to receive the irrigation liquid;

a discharging part disposed in a second surface of the emitter main body and configured to discharge the irrigation liquid, the second surface being opposite to the first surface and being configured to face the discharging port;

a first channel configured to connect the liquid intake part and the discharging part together, and to distribute the irrigation liquid;

a second channel configured to connect the liquid intake part and the discharging part together, and to distribute the irrigation liquid;

a flow rate reducing part disposed in the first channel located downstream of the first intake through hole and the second intake through hole and including a flow rate reducing recess opening at the first surface and the film closing an opening of the flow rate reducing recess, the flow rate reducing part being configured to reduce a flow rate of the irrigation liquid flowing to the discharging port by deformation of the film in accordance with a pressure of the irrigation liquid in the tube;

a channel opening-closing part disposed in the second channel and including a channel opening-closing recess opening at the first surface and the film closing an opening of the channel opening-closing recess, the channel opening-closing part being configured to open and close the second channel by deformation of the film in accordance with the pressure of the irrigation liquid in the tube;

a pressure reducing channel disposed in the first channel located upstream of the flow rate reducing part, the pressure reducing channel being configured to guide, to the flow rate reducing part, the irrigation liquid received from the liquid intake part while reducing a pressure of the irrigation liquid received from the liquid intake part; and a bypass channel disposed in the second channel located upstream of the channel opening-closing part, the bypass channel being configured to guide, to the channel opening-closing part, the irrigation liquid received from the liquid intake part while maintaining the pressure of the irrigation liquid received from the liquid intake part at a pressure higher than a pressure of the irrigation liquid which has flown through the pressure reducing channel, wherein when the pressure of the irrigation liquid in the tube is lower than a first pressure, an opening of the first intake through hole is closed with the film, wherein when the pressure of the irrigation liquid in the tube is equal to or higher than the first pressure, the film deforms, and the irrigation liquid is allowed to enter the emitter main body through a gap between the first intake through hole, the film and the cover and the second intake through hole, wherein when the pressure of the irrigation liquid in the tube the is equal to or higher than the first pressure and lower than a second pressure higher than the first pressure, the irrigation liquid received from the liquid intake part is guided to the discharging part through the pressure reducing channel and the bypass channel, and wherein when the pressure of the irrigation liquid in the tube is equal to or higher than the second pressure, the channel opening-closing part closes the second channel, and the irrigation liquid received from the liquid intake part is guided to the discharging part through the pressure reducing channel.

2. The emitter according to claim 1, wherein the first intake through hole and the second intake through hole are disposed such that the first intake through hole and the second intake through hole are spaced apart when the emitter is viewed from a cover side.

3. The emitter according to claim 1, wherein when the emitter is viewed from a cover side, a distance between the first intake through hole and the second intake through hole falls within a range of 1.0 to 5.0 mm.

4. A drip irrigation tube, comprising:
- a tube including a discharging port configured to discharge irrigation liquid; and
- an emitter joined at a position corresponding to the discharging port of an inner wall surface of the tube, the emitter including an emitter main body, a film having flexibility disposed on a first surface of the emitter main body, and a cover for positioning the film with respect to the emitter main body, the emitter being configured to quantitatively discharge the irrigation liquid in the tube to the outside of the tube from the discharging port, wherein the emitter comprises:
- a liquid intake part including a first intake through hole formed in the cover and a second intake through hole formed in the film, the liquid intake part being configured to receive the irrigation liquid;
- a discharging part disposed in a second surface of the emitter main body and configured to discharge the irrigation liquid, the second surface being opposite to the first surface and being configured to face the discharging port;
- a first channel configured to connect the liquid intake part and the discharging part together, and to distribute the irrigation liquid;
- a second channel configured to connect the liquid intake part and the discharging part together, and to distribute the irrigation liquid;
- a flow rate reducing part disposed in the first channel located downstream of the first intake through hole and the second intake through hole and including a flow rate reducing recess opening at the first surface and the film closing an opening of the flow rate reducing recess, the flow rate reducing part being configured to reduce a flow rate of the irrigation liquid flowing to the discharging port by deformation of the film in accordance with a pressure of the irrigation liquid in the tube;
- a channel opening-closing part disposed in the second channel and including a channel opening-closing recess opening at the first surface and the film closing an opening of the channel opening-closing recess, the channel opening-closing part being configured to open and close the second channel by deformation of the film in accordance with the pressure of the irrigation liquid in the tube;
- a pressure reducing channel disposed in the first channel located upstream of the flow rate reducing part, the pressure reducing channel being configured to guide, to the flow rate reducing part, the irrigation liquid received from the liquid intake part while reducing a pressure of the irrigation liquid received from the liquid intake part, and
- a bypass channel disposed in the second channel located upstream of the channel opening-closing part, the bypass channel being configured to guide, to the channel opening-closing part, the irrigation liquid received from the liquid intake part while maintaining the pressure of the irrigation liquid received from the liquid intake part at a pressure higher than a pressure of the irrigation liquid which has flown through the pressure reducing channel, wherein when the pressure of the irrigation liquid in the tube is lower than a first pressure, an opening of the first intake through hole is closed with the film, wherein when the pressure of the irrigation liquid in the tube is equal to or higher than the first pressure, the film deforms, and the irrigation liquid is allowed to enter the emitter main body through a gap between the first intake through hole, the film and the cover and the second intake through hole, wherein when the pressure of the irrigation liquid in the tube the is equal to or higher than the first pressure and lower than a second pressure higher than the first pressure, the irrigation liquid received from the liquid intake part is guided to the discharging part through the pressure reducing channel and the bypass channel, and wherein when the pressure of the irrigation liquid in the tube is equal to or higher than the second pressure, the channel opening-closing part closes the second channel, and the irrigation liquid received from the liquid intake part is guided to the discharging part through the pressure reducing channel.

* * * * *